United States Patent [19]

Hasuda et al.

[11] Patent Number: 4,784,767

[45] Date of Patent: Nov. 15, 1988

[54] MAGNETIC SEPARATOR FOR FLUIDS

[75] Inventors: Tetsuhiko Hasuda, Yatabe; Yoshihisa Kitora, Amagasaki; Kiyoshi Taketou, Amagasaki; Akira Ichikawa, Amagasaki, all of Japan

[73] Assignees: Director General, Agency of Industrial Science and Technology; Mitsubishi Denki Kabushiki Kaisha, both of Japan

[21] Appl. No.: 26,470

[22] Filed: Mar. 16, 1987

[30] Foreign Application Priority Data

Mar. 20, 1986 [JP] Japan .................................. 61-63417
Mar. 20, 1986 [JP] Japan .................................. 61-63418

[51] Int. Cl.⁴ .............................................. B01D 35/06

[52] U.S. Cl. ...................................... 210/222; 55/100; 55/242; 55/282; 210/388; 210/391; 210/409

[58] Field of Search ........................ 55/100, 242, 282; 209/223 R, 225, 226, 228, 232; 210/222, 223, 243, 388, 391, 409

[56] References Cited

U.S. PATENT DOCUMENTS 4,354,856 10/1982 Lewis ............................ 209/228 X

FOREIGN PATENT DOCUMENTS 175514 9/1985 Japan .................................. 210/222
1153117 7/1986 Japan .................................. 210/222

OTHER PUBLICATIONS

"Magnetic Separation: A Review of Principles, Devices, and Applications", IEEE Transactions on Magnetics, vol. MAG-10, No. 2, Jun. 1974.

*Primary Examiner*—Richard V. Fisher
*Assistant Examiner*—W. Gary Jones
*Attorney, Agent, or Firm*—Leydig, Voit & Mayer

[57] ABSTRACT

A magnetic separator for fluids has a non-magnetic container which is divided into a trapping portion and an accumulating portion. A fluid containing magnetic particles to be removed therefrom is introduced via an inflow pipe and discharged via a discharge pipe located in the top and bottom, respectively, of the trapping portion. A pair of electrodes are mounted in opposite end walls of the container, and a plurality of magnetizable wires are strung across the container in parallel between the electrodes. The electrodes are electrically connected to a mechanism for generating alternating current whose frequency components are harmonics of the fundamental frequency of vibration of the magnetizable wires. The container is situated between a pair of magnets which produce a magnetic field whose strength increases from the trapping portion to the accumulating portion. The magnetic field strength is preferably a maximum in the accumulating portion at a position removed from the end wall of the accumulating portion.

14 Claims, 7 Drawing Sheets

(a)

(b)

(a) (b)

MAGNETIC SEPARATOR FOR FLUIDS

BACKGROUND OF THE INVENTION

This invention relates to a magnetic separator for separating magnetic particles from a fluid by magnetic force.

FIGS. 1 and 2 illustrate a conventional magnetic separator of the type to which the present invention pertains. FIG. 1 being a vertical cross-sectional view and FIG. 2 being a perspective view thereof. This magnetic separator comprises a non-magnetic container 1 having inflow pipes 2 and 4 formed in its upper portion and corresponding discharge pipes 3 and 5 formed in its bottom portion. Inflow pipe 2 and discharge pipe 3 are for a fluid containing magnetic particles which are to be removed therefrom, while inflow pipe 4 and discharge pipe 5 are for washing water. The inside of the container 1 is divided into a particle trapping portion 7 and a particle accumulating portion 8 by a vertically-extending partition 6 having a plurality of through holes formed therein. A plurality of magnetizable wires 9 are stretched horizontally across the length of the container 1 with their ends secured to opposite walls of the container 1. A mechanical vibrator 12 for vibrating the magnetizable wires 9 extends through an opening formed in the upper portion of the container 1. As shown in FIG. 2, the container 1 is disposed between a pair of magnetic poles 13 with magnetize the magnetizable wires 9. The faces of the poles 13 are angled towards one another so that the strength of the magnetic field produced thereby within the container 1 linearly increases from the trapping portion 7 towards the accumulating portion 8.

During the operation of this conventional apparatus, a fluid 10 containing magnetic particles is introduced into the container 1 via inflow pipe 2, while washing water 11 is introduced via inflow pipe 4. The wires 9 are magnetized by the magnetic field produced by the poles 13, a magnetic attractive force which is proportional to the strength of the magnetic field and to the magnitude of the magnetic field gradient acts on the magnetic particles, and the magnetic particles contained in the fluid 10 are trapped by the magnetizable wires 9 as the fluid 10 flows therethrough.

While the fluid 10 is passing through the container 1, the mechanical vibrator 12 is operated to vibrate the fluid 10, the magnetizable wires 9, and the magnetic particles. The vibration forces the trapped magnetic particles to momentarily separate from the magnetizable wires 9, but upon separating, the magnetic attractive force causes them to reattach to the magnetizable wires 9. Each time the magnetic particles separate from the wires 9, they are moved by the magnetic field slightly in the direction of the accumulating portion 8 before they again attach to the magnetizable wires 9. Thus, as the magnetic particles repeatedly separate from and attach to the magnetizable wires 9, they are gradually conveyed from the trapping portion 7 into the accumulating portion 8 via the through holes in the partition 6. In the accumulating portion 8, the magnetic particles are removed from the magnetizable wires 9 by the downwards flow of washing water 11 through the accumulating portion 8, and the washing water 11 and the magnetic particles are together discharged from the container 1 via discharge pipe 5. The fluid 10, from which the magnetic particles have been removed, is discharged via outflow pipe 3.

The use of a mechanical vibrator 12 in this conventional magnetic separator to vibrate the magnetizable wires 9 and the magnetic particles creates the problem that the strength of the vibrations produced thereby varies depending on the distance of the wires 9 from the vibrator 12 and the path by which the vibrations are transmitted to the wires 9. As a result, the strength of the vibrations greatly varies over the length of each wire 9 and among the wires 9. At some locations along the wires 9, the vibrations are so strong that the magnetic particles become completely detached from the wires 9 and cannot reattach thereto. On the other hand, at other locations, the vibrations are too weak to make the magnetic particles detach from the wires 9, and the magnetic particles remain attached to the wires 9 at those locations and are not conveyed along the length of the wires 9 to the accumulating portion 8. Therefore, this conventional apparatus is unable to reliably separate the magnetic particles from the fluid in which they are contained and collect them.

Another problem with this type of conventional magnetic separator is that the strength of the magnetic field within the container 1 is a maximum at the end of the accumulating compartment 8 farthest from the trapping portion 7 (the far right end in FIG. 1). Therefore, the magnetic particles are continually pushed by the magnetic field against the right wall of the container 1 and accumulate there. It is possible to force the magnetic particles accumulated along the wall of the container 1 to separate from the magnetizable wires 9 by increasing the flow speed of the washing water 11. However, an increased flow speed causes some of the magnetic particles which were accumulated in the accumulating portion 8 to be carried back into the trapping portion 7 through the holes in the partition 6, resulting in a decrease in the recovery of magnetic particles.

SUMMARY OF THE INVENTION

It is an object of the present invention to provide a magnetic separator for fluids containing magnetic particles which can trap the magnetic particles and reliably convey them along the length of magnetizable wires from a trapping portion to an accumulating portion.

It is another object of the present invention to provide a magnetic separator which employs a very low flow speed of washing water for removing magnetic particles from the magnetizable wires.

In a magnetic separator for fluids according to the present invention, magnetizable wires for trapping magnetic particles in the fluid are strung between electrodes which are mounted at opposite ends of a container, and an alternating electric current is passed through the magnetizable wires. The alternating current has a plurality of frequency components which are multiples of the fundamental frequency of vibration of the magnetizable wires. The container is positioned in a magnetic field produced by a pair of confronting magnetic poles, the magnetic field crossing the magnetizable wires at right angles. When a current is passed through the magnetizable wires, the magnetic field produced by the poles exerts a time-varying force on the magnetizable wires, causing them to vibrate at the frequencies of the imposed current. All of the magnetizable wires can be uniformly vibrated and magnetic particles can be reliably conveyed along the wires from a trapping portion to an accumulating portion.

In a preferred embodiment, the pole faces of the magnetic poles are shaped so that the strength of the magnetic field within the container increases from the trapping portion to the accumulating portion and reaches a maximum strength within the accumulating portion and is less than this maximum along the walls of the accumulating portion so that magnetic particles will not be pushed against the walls by the magnetic field.

Figure 3:
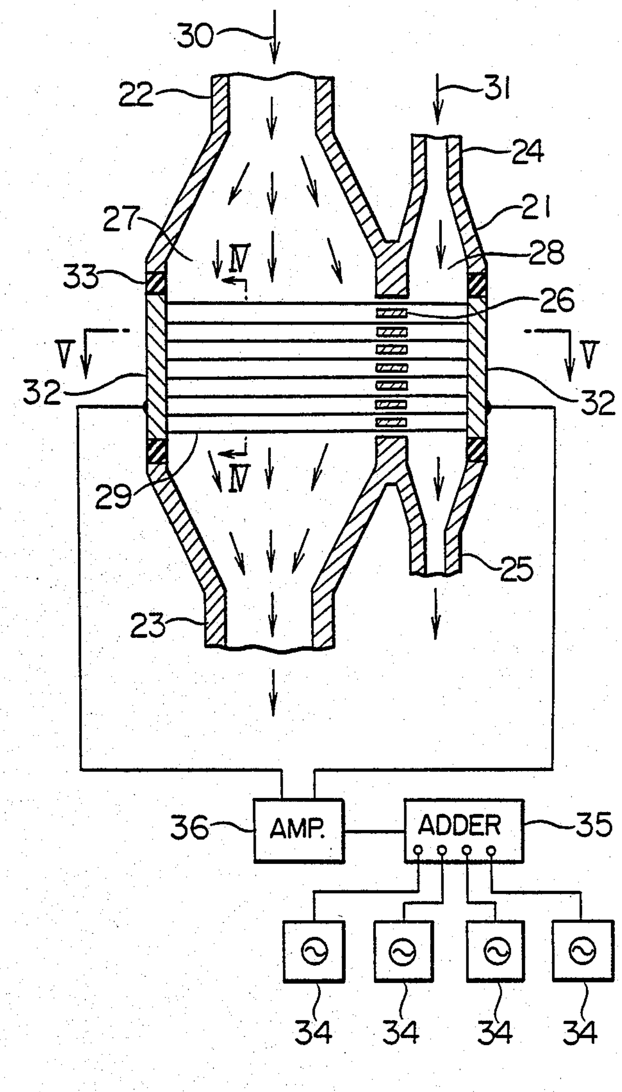
FIG. 3 is a vertical cross-sectional view of a first embodiment of a magnetic separator according to the present invention.

FIG. *6a* is a vertical cross-sectional view of a portion of the embodiment of FIG. 3 surrounding a single magnetizable wire, and FIG. *6b* is a graph showing the variation in the strength of the magnetic field along its length.

FIGS. *7a* and *7b* are schematic views of a section of a magnetizable wire of the embodiment of FIG. 3, illustrating the direction of the force acting thereon when it is carrying a current in a magnetic field.

FIGS. *8a–8d* are schematic views of a single magnetizable wire of the embodiment of FIG. 3, showing the modes of vibration thereof.

Figure 9:
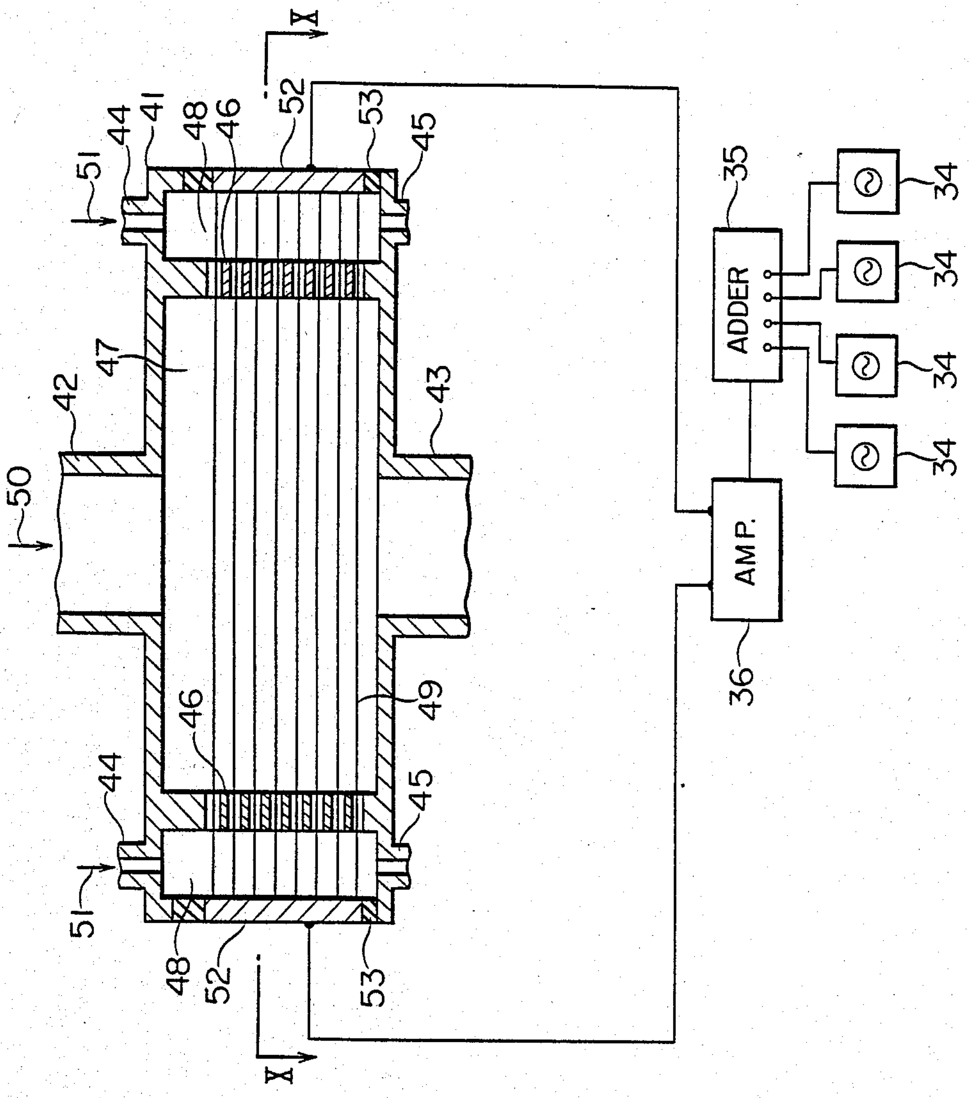

FIG. 9 is a vertical cross-sectional view of a second embodiment of the present invention.

Figure 10:
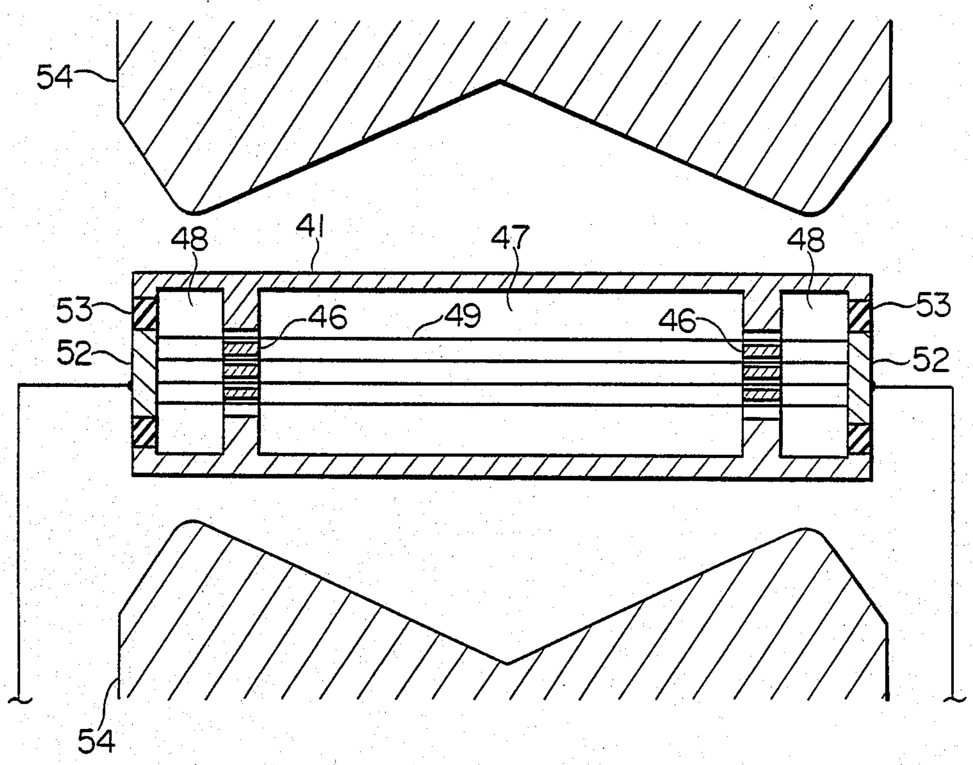

FIG. 10 is a horizontal cross-sectional view taken along Line X—X of FIG. 9.

In the drawings, the same reference numerals indicate the same or corresponding parts.

DESCRIPTION OF THE PREFERRED EMBODIMENTS

Figure 1:
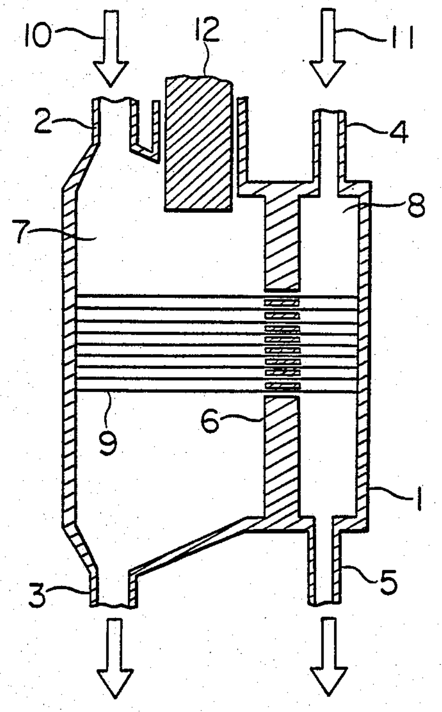
FIG. 1 PRIOR ART
FIG. 1 is a vertical cross-sectional view of a conventional magnetic separator for fluids.
Figure 4:
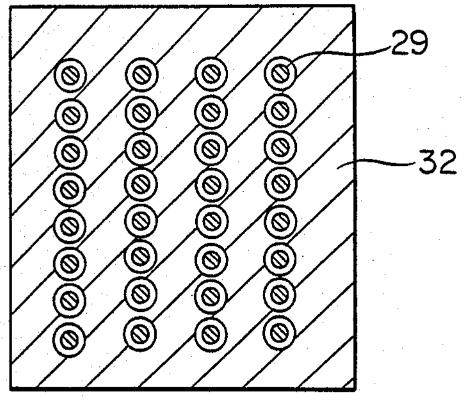
FIG. 4 is a cross-sectional view taken along Line IV—IV of FIG. 3.

Hereinunder, a number of preferred embodiments of a magnetic separator according to the present invention will be described while referring to FIGS. 3 through 10 of the accompanying drawings, of which FIG. 3 is a vertical cross-sectional view of a first embodiment. The overall structure of this first embodiment is similar to that of the conventional magnetic separator shown in FIG. 1. A non-magnetic container 21 has inflow pipes 22 and 24 formed in its upper portion and corresponding discharge pipes 23 and 25 formed in its bottom portion. Inflow pipe 22 and discharge pipe 23 are for a fluid containing magnetic particles which are to be removed therefrom, while inflow pipe 24 and discharge pipe 25 are for a washing fluid, which in the present embodiment is washing water. The inside of the container 21 is divided into a particle trapping portion 27 and a particle accumulating portion 28 by a vertically-extending partition 26 having a plurality of through holes formed therein. Inflow pipe 22 and discharge pipe 23 communicate with the trapping portion 27, while inflow pipe 24 and discharge pipe 25 communicate with the accumulating portion 28. A plurality of electrically-conducting, magnetizable wires 29 are stretched horizontally across the length of the container 21 and pass through the holes in the partition 26. The diameter of the through holes in the partition 26 is sufficiently larger than the diameter of the wires 29 so that magnetic particles which are attached to the wires 29 can pass through the holes. The ends of the wires 29 are secured to a pair of electrodes 32 which are secured to the walls of the container 21 and insulated therefrom by electrical insulation 33. As shown in FIG. 4, which is a cross-sectional view taken along Line IV—IV of FIG. 3, the magnetizable wires 29 are arranged in a matrix of parallel rows and columns. However, there is no restriction on the number of wires 29 which are used, and they need not be arranged in the pattern shown in FIG. 4. The magnetizable wires 29 constitute means for trapping magnetic particles in a fluid passing through the trapping portion 27.

A plurality of signal generators 34 which produce alternating current output signals of different prescribed frequencies are electrically connected to an adder 35 which produces an output signal which is a composite of the input signals from all the signal generators 34. The composite signal from the adder 35 is input to an amplifier 36, which produces an amplified alternating current signal proportional to the signal from the adder 35, and the amplified signal is applied across the two electrodes 32. One of the signal generators 34 produces an output signal whose frequency is the fundamental frequency of vibration of the magnetizable wires 29, and each of the other signal generators 34 produces a signal whose frequency is the second, third, or fourth harmonic of the fundamental frequency.

Figure 2:
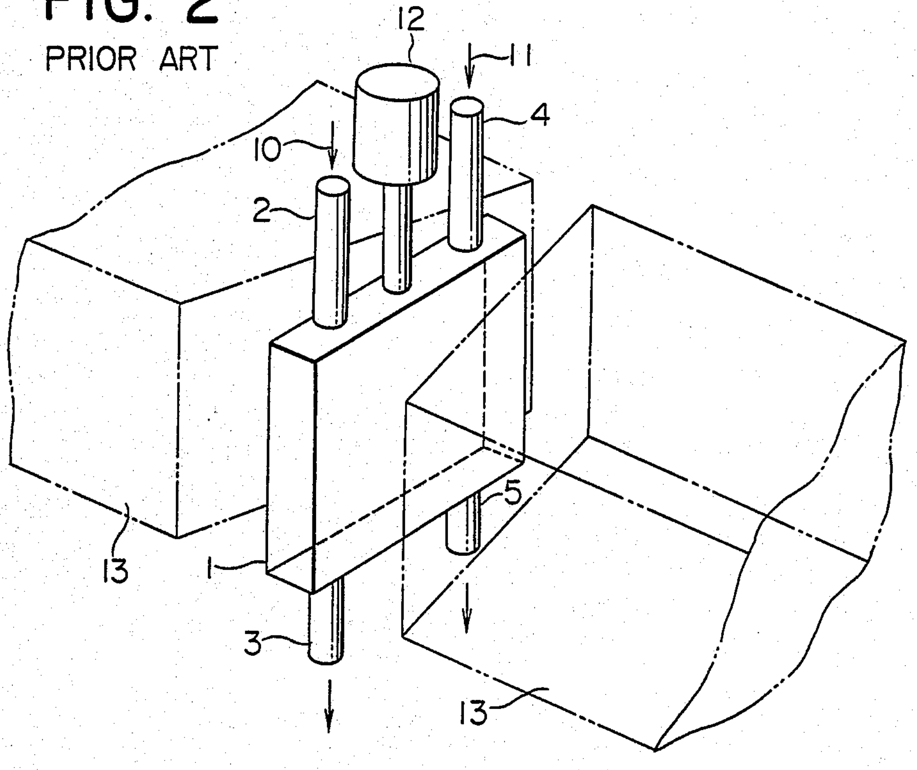
FIG. 2 PRIOR ART
FIG. 2 is a perspective view of the separator shown in FIG. 1.
Figure 5:
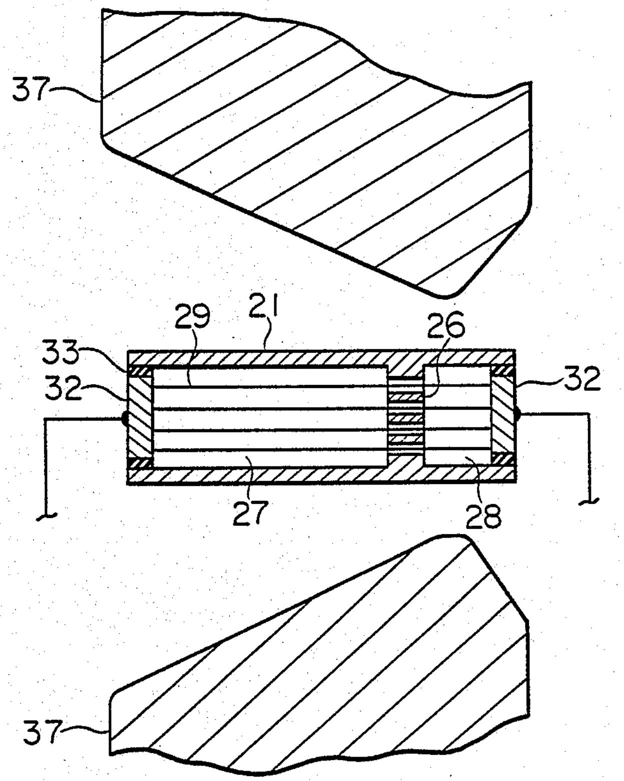
FIG. 5 is a horizontal cross-sectional view taken along Line V—V of FIG. 3, showing the shape of the pole faces of the magnetic poles of the separator.
Figure 6:
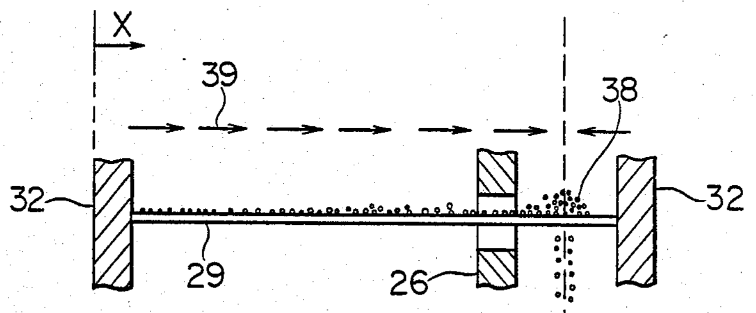
Figure 6:
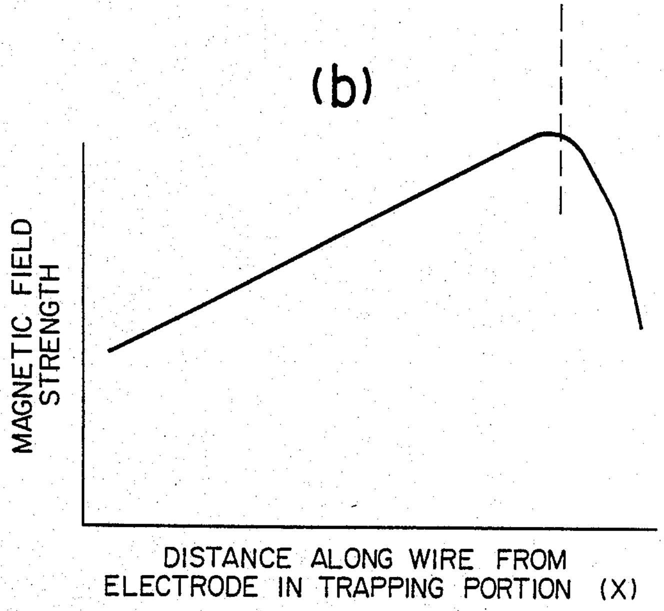
Figure 7:
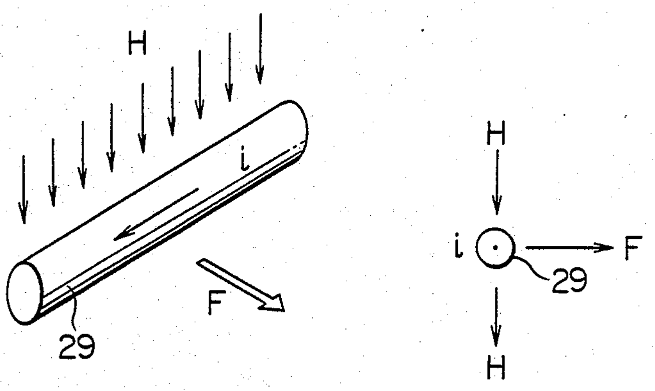
Figure 8:
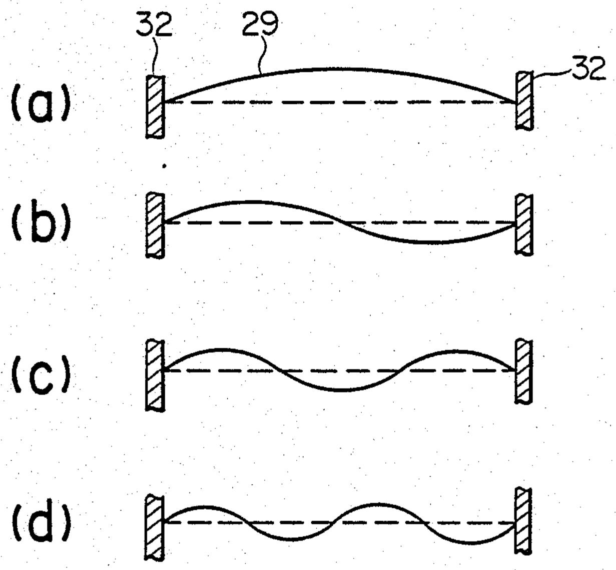

The container 21 is disposed between a pair of magnetic poles 37 which produce a magnetic field whose direction is perpendicular to the axes of the magnetizable wires 29. In the present invention, permanent magnets are employed to produce the magnetic field, but electromagnets may be used instead. Although the pole faces may be simple flat surfaces which are angled towards one another in the same manner as in the conventional magnetic separator of FIG. 2, preferably the poles faces are shaped such that the magnetic field strength continually increases from the trapping portion 27 to the accumulating portion 28 and reaches a maximum in the accumulating portion 28 somewhere between the partition 26 and the electrode 32 in the accumulating portion 28. Furthermore, the strength of the magnetic field preferably decreases from this maximum value towards the right electrode 32 of the accumulating portion 28. Such poles are shown in FIG. 5, which is a horizontal cross-sectional view taken along Line V—V of FIG. 3. Each pole face is angled towards that of the opposite pole 37 so that the separation between the poles 37 gradually and linearly decreases from the trapping portion 27 to the accumulating portion 28 and is a minimum at approximately the middle of the accumulating portion 28. From this point of minimum separation, the separation between the poles 37 then gradually increases towards the right electrode 32 in FIG. 5. With this geometry, the strength of the magnetic field continuously increases from both ends of the container 21 and is a maximum in roughly the middle of the accumulating portion 28 where the pole separation is smallest. FIGS. 6a and 6b are a side view of a single magnetizable wire 29 and a graph of the strength of the magnetic field along the length of the wire 29 with the above-described arrangement of magnetic poles. The changing magnetic field strength produces a horizontal force which acts on magnetic particles 38 which are trapped by the wire 29. The direction of this horizontal force is indicated by the horizontal arrows 39 in FIG. 6a. At all points along the wire 29, this force is directed towards the vertical plane in which the magnetic field strength is greatest, corresponding to the location of minimum pole separation. As the maximum field strength is located to the left of the right electrode 32 in the accumulating portion 28, magnetic particles 38 are pushed away from the electrode 32 rather than towards it.

During the operation of this embodiment, a fluid 30 containing magnetic particles to be removed therefrom is introduced into the container 21 via inflow pipe 22 and flows downwards through the trapping portion 27 past the magnetizable wires 29. The magnetizable wires 29, which are magnetized by the magnetic field generated by the magnetic poles 37, trap the magnetic particles contained in the fluid 30, and the fluid 30 from which the magnetic particles have been separated is discharged from discharge pipe 23.

While the fluid 30 is flowing through the container 21, an alternating current having a multiple of frequency components is passed through the magnetizable wires 29 by the amplifier 36. As shown in FIGS. *7a* and *7b*, which are schematic views of a short section of a magnetizable wire 29 in a magnetic field H, when a current i is passed through the wire 29, a force F acts on the wire 29, the direction thereof being orthogonal to the direction of the magnetic field H and the direction of the current i. Since the current which is passed through the magnetizable wire 29 is an alternating one, the direction of the force acting on the wire 29 will alternate, causing the wire 29 to vibrate at the frequency of the alternating current.

In the present invention, the alternating current which is passed through the wires 29 has a plurality of frequency components which are harmonics of the fundamental frequency of vibration of the wires 29. The component which is the first harmonic of the fundamental frequency of vibration will make the wires 29 vibrate in the manner shown in FIG. *8a*, with a wavelength of twice the distance between the electrodes 32. The component which is the second harmonic of the fundamental frequency will make the wires 29 vibrate in the manner shown in FIG. *8b*, with a wavelength equal to the distance between the electrodes 32. The third and fourth harmonics will make the wires 29 vibrate in the manners shown in FIGS. *8c* and *8d*, respectively, with wavelengths of $\frac{2}{3}$ and $\frac{1}{2}$, respectively the distance between the electrodes 32. All of these four frequency components are simultaneously contained in the current passed through the wires 29, and therefore the vibration of the wires 29 will be a composite of the four modes of vibration illustrated in FIG. 8. In a conventional magnetic separator employing a magnetic vibrator, the strength of the vibration of a wire depends on the location of the wire within the container. However, in the present invention, the same current is passed through all of the magnetizable wires 29, and provided that the size and the tension of each wire 29 is the same, all of the wires 29 can be made to vibrate uniformly.

The frequency of the current which is passed through the magnetizable wires 29 need not be a harmonic of the fundamental frequency of vibration of the wires 29. Any alternating current will produce vibrations. However, if the wires 29 are made to vibrate at a multiple of their fundamental frequency of vibration, large vibrations can be produced by a very small current, and therefore the frequency of the current is preferably a harmonic of the fundamental frequency. It is also possible to use a current having only a single frequency component,but the wires 29 can be made to more uniformly vibrate over their entire lengths if the current has a plurality of frequency components which are different harmonics of the fundamental frequency.

In the trapping portion 27, the magnetic particles which are trapped by the magnetizable wires 29 are forced to momentarily separate from the wires 29 due to the vibration of the wires 29, and then reattach to the wires 29 due to the attractive magnetic force. As the magnetic particles repeatedly separate from and reattach to the wires 29, they are transported along the wires 29 from the trapping portion 27 into the accumulating portion 28 by the magnetic field produced by the magnetic poles 37 in the manner shown in FIG. 6a. As the horizontal force acting on the magnetic particles is directed towards the position at which the magnetic field strength is a maximum, the magnetic particles will accumulate on the magnetizable wires 29 at this position in the accumulating portion 28, approximately midway between the partition 26 and the right electrode 32. In contrast to a conventional magnetic separator, there is a force pushing magnetic particles 38 away from the wall of the accumulating portion 28 rather than towards it, and no particles 38 will accumulate along the wall. Magnetic particles 38 which are conveyed from the trapping portion 27 will continue to accumulate at this position on the wires 29 until a point of saturation is reached and the wires 29 can hold no more magnetic particles 38. Any further magnetic particles 38 which are conveyed from the trapping portion 27 will permanently separate from the magnetizable wires 29 upon reaching this position and will sink downwards to be discharged from the container 21 together with washing water 31 via discharge pipe 25.

Thus, since the magnetic particles will become permanently detached from the magnetizable wires 29 due to the vibration of the wires 29 upon reaching the position where the magnetic field strength is a maximum, the washing water 31 need serve only as a means for transporting the particles through the accumulating portion 28 to the discharge pipe 25, and it is not necessary to forcefully detach the magnetic particles from the magnetizable wires 29 with the washing water 31. Accordingly, the flow speed of the washing water 31 can be made extremely low, and it is even possible to eliminate the washing water 31. Not only does a low flow speed of the washing water 31 prevent the magnetic particles from being carried back into the trapping portion 27, it also increases the concentration of magnetic particles in the washing water 31 and simplifies the recovery of the particles.

FIG. 9 is a vertical cross-sectional view of a second embodiment of a magnetic separator according to the present invention, and FIG. 10 is a horizontal cross-sectional view thereof taken along Line X—X of FIG. 9. The overall structure of this embodiment is similar to that of the first embodiment, but it is symmetrical about a vertical axis when viewed in cross section. A non-magnetic container 41 has an inflow pipe 42 for a fluid containing magnetic particles formed in the center of its upper portion and a corresponding discharge pipe 43 formed in the center of its bottom portion. Inflow pipes 44 and discharge pipes 45 for washing water are formed in the upper and lower portions, respectively, of the container 41 at both ends thereof. The inside of the container 41 is divided into a centrally-located trapping portion 47 and a pair of accumulating portions 48 at opposite ends of the container 41 by a pair of vertically-extending partitions 46 having through holes formed therein. A pair of electrodes 52 are mounted in the end walls of the container 41 and are insulated from the container 41 by electrical insulation 53. A plurality of magnetizable wires 49 arranged in parallel rows and columns are strung between the electrodes 52 so as to pass through the holes in the partitions 46. An alternating current having a plurality of frequency components which are harmonics of the fundamental frequency of vibration of the magnetizable wires 49 is passed through the magnetizable wires 49 by a plurality of signal generators 34, an adder 35, and an amplifier 36 which are connected with one another in the same manner as in the first embodiment.

As shown in FIG. 10, the container 41 is disposed between a pair of magnetic poles 54. The pole faces are shaped so that the separation between them is a maximum at the center of the trapping portion 47 of the container 41, linearly and gradually decreases to a minimum in both of the accumulating portions 48, and then gradually increases towards the electrodes 52. With this geometry, the magnetic field strength is a minimum at the center of the trapping portion 47 and reaches maximum values in the accumulating portions 48, roughly midway between the partitions 46 and the electrodes 52.

During operation of the embodiment, a fluid 50 containing magnetic particles to be separated therefrom is introduced through inflow pipe 42, and washing water 51 is introduced through both of inflow pipes 44. An alternating current having a plurality of frequency components which are harmonics of the fundamental frequency of vibration of the magnetizable wires 49 is passed through the wires 49 by the amplifier 36, causing all the wires 49 to vibrate uniformly. In the same manner as described above, the magnetic particles are conveyed along the magnetizable wires 49 from the trapping portion 47 into the accumulating portions 48 by the magnetic field producted by the poles 54 as they repeatedly separate from and attach to the magnetizable wires 49. As in the previous embodiment, magnetic particles accumulate on the wires 49 in the accumulating portions 48 at the positions of maximum magnetic field strength until a point of saturation is reached. Any further magnetic particles which are conveyed into the accumulating portions 48 permanently detach from the magnetizable wires 49 upon reaching these positions and sink to the bottom of the container 41, to be discharged from the discharge pipes 45 together with washing water 51. As in the previous embodiment, there is no accumulation of magnetic particles along the walls of the container 41, and the magnetic particles detach from the magnetizable wires 49 due to the force of the vibrations of the wires 49, so that the flow speed of the washing water 51 can be made extremely low or even zero.

In the above-described embodiments, the magnetic field within the container has a maximum strength at one location within each of the accumulating portions, but it is also possible for the field strength to be a maximum at a plurality of locations within each accumulating portion.

The means for trapping magnetic particles in the above-described embodiments is in the form of a plurality of parallel, magnetizable wires. However, it is also possible for the trapping means to be in the form of a mesh of an electrically-conducting, magnetizable material which extends for the length of a container and whose ends are secured to electrodes at opposite ends of the container.

The magnetic poles in the above-described embodiments are located outside of the container of the separator, but it is possible for the magnetic poles to be built into the walls of the container. It is also possible to eliminate the partition between the trapping and accumulating portions.

Furthermore, although the fluid containing magnetic particles in the above embodiments is a liquid, a magnetic separator according to the present invention can also be applied to the separation of magnetic particles from gases.

What is claimed is:

1. A magnetic separator for fluid containing magnetic particles comprising:

a container having end walls and which is divided by a first partition into a particle trapping portion and a first particle accumulating portion which are in fluid communication with one another, the upper portion of said trapping portion being equipped with a fluid inlet and the lower portion being equipped with a fluid outlet for said fluid containing magnetic particles;

means for producing a magnetic field within said container, which increases from said trapping portion to reach a maximum between one of said end walls associated with said first particle accumulating portion of said container and said first partition;

particle trapping means for trapping said magnetic particles in said fluid as said fluid flows from said fluid inlet to said fluid outlet, said particle trapping means extending across said container through said trapping portion and said accumulating portion and being made of an electrically-conducting material which can be magnetized by said means for producing a magnetic field and being oriented with respect to said magnetic field so that said magnetic field will exert a force on said particle trapping means when an electric current is passed therethrough; and means for passing an alternating electric current through said particle trapping means.

2. A magnetic separator as claimed in claim 1 wherein said particle trapping means comprises a plurality of parallel wires whose ends are secured to opposite end walls of said container and whose axes are perpendicular to the direction of said magnetic field.

3. A magnetic separator as claimed in claim 2, said first partition having a plurality of through holes formed therein through which said wires pass, said through holes being sufficiently large in diameter for said magnetic particles to pass therethrough around said wires.

4. A magnetic separator as claimed in claim 3 wherein the upper portion of said accumulating portion is equipped with a washing fluid inlet and the lower portion of said accumulating portion is equipped with a washing fluid outlet, the portion of said wires which is within said accumulating portion being disposed between said washing fluid inlet and said washing fluid outlet.

5. A magnetic separator as claimed in claim1 wherein said particle trapping means comprises a mesh whose ends are secured to opposite end walls of said container.

6. A magnetic separator as claimed in claim 1 wherein said particle trapping means has a fundamental frequency of vibration, and said alternating current has one or more frequency components, each of which is a harmonic of said fundamental frequency.

7. A magnetic separator as claimed in claim 1 wherein:

said container includes a second accumulating portion separated from said first accumulating portion by said particle trapping portion and joined to said second particle trapping portion by a second partition; and the strength of said magnetic field increases from the center of said trapping portion towards both of said accumulating portions to reach a maximum between end walls associated with each of said accumulating portions and said first and second partitions.

8. A magnetic separator as claimed in claim 7 wherein said particle trapping means comprises a plurality of parallel wires whose ends are secured to opposite end walls of said container and whose axes are perpendicular to the direction of said magnetic field.

9. A magnetic separator as claimed in claim 8 further comprising an additional partition, the two partitions being secured to said container and separating said trapping portion from said accumulating portions, said partitions having a plurality of through holes formed therein through which said wires pass, said through holes being sufficiently large in diameter for said magnetic particles to pass therethrough around said wires.

10. A magnetic separator as claimed in claim 9 wherein the upper portion of each accumulating portion is equipped with a washing fluid inlet and the lower portion of each accumulating portion is equipped with a washing fluid outlet, the portion of said wires which is within said accumulating portion being disposed between said washing fluid inlet and said washing fluid outlet.

11. A magnetic separator as claimed in claim 7 wherein said particle trapping means comprises a mesh whose ends are secured to opposite end walls of said container.

12. A magnetic separator as claimed in claim 7 wherein said particle trapping means has a fundamental frequency of vibration, and said alternating current has one or more frequency components, each of which is a harmonic of said fundamental frequency.

13. A magnetic separator for a fluid containing magnetic particles comprising:

a container which is divided into a particle trapping portion and a particle accumulating portion which are in fluid communication with one another, an upper portion of said trapping portion being equipped with means defining a fluid inlet and a lower portion being equipped with means defining a fluid outlet for said fluid containing magnetic particles;

means for producing a magnetic field within said container, which increases from said trapping portion to said accumulating portion;

particle trapping means for trapping said magnetic particles in said fluid as said fluid flows from said fluid inlet to said fluid outlet, said particle trapping means extending across said container through said trapping portion and said accumulating portion and being made of an electrically-conducting material which can be magnetized by said means for producing a magnetic field and being oriented with respect to said magnetic field so that said magnetic field will exert a force on said particle trapping means when an alternating electric current is passed therethrough; and means for passing an alternating electric current through said particle trapping means where said alternating current has one or more frequency components, each of which is a harmonic of the fundamental frequency of said particle trapping means.

14. A magnetic separator as claimed in claim 13 wherein:

said container includes a second accumulating portion spaced from said first accumulating portion by said particle trapping portion and separated from said second particle trapping portion; and the strength of said magnetic field increases from the center of said trapping portion towards both of said accumulating portions to reach a maximum between end walls associated with each of said accumulating portions and said first and second partitions.

* * * * *